United States Patent
Wang et al.

(10) Patent No.: US 9,104,277 B2
(45) Date of Patent: Aug. 11, 2015

(54) SENSING METHOD AND CALIBRATION METHOD FOR A CAPACITIVE TOUCH PANEL

(75) Inventors: Tsun-Min Wang, Miaoli County (TW); Chun-Chung Huang, Hsinchu (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 775 days.

(21) Appl. No.: 12/946,230

(22) Filed: Nov. 15, 2010

(65) Prior Publication Data

US 2011/0115743 A1    May 19, 2011

(30) Foreign Application Priority Data

Nov. 19, 2009 (TW) .............................. 098139327 A

(51) Int. Cl.
G06F 3/041 (2006.01)
G06F 3/044 (2006.01)

(52) U.S. Cl.
CPC ...................................... G06F 3/044 (2013.01)

(58) Field of Classification Search
CPC ............................... G06F 3/044; G06F 3/0418
USPC .................................................. 345/173, 178
See application file for complete search history.

(56) References Cited

U.S. PATENT DOCUMENTS

| | | | |
|---|---|---|---|
| 8,378,981 B2* | 2/2013 | Yilmaz et al. | 345/173 |
| 2002/0011991 A1* | 1/2002 | Iwasaki et al. | 345/173 |
| 2002/0070926 A1* | 6/2002 | Kavanagh | 345/173 |
| 2003/0098858 A1* | 5/2003 | Perski et al. | 345/173 |
| 2004/0217945 A1* | 11/2004 | Miyamoto et al. | 345/173 |
| 2006/0125801 A1 | 6/2006 | Hsu et al. | |
| 2006/0267953 A1* | 11/2006 | Peterson et al. | 345/173 |
| 2008/0042994 A1* | 2/2008 | Gillespie et al. | 345/174 |
| 2008/0158172 A1* | 7/2008 | Hotelling et al. | 345/173 |
| 2008/0158174 A1* | 7/2008 | Land et al. | 345/173 |
| 2008/0158182 A1* | 7/2008 | Westerman | 345/173 |
| 2011/0115717 A1* | 5/2011 | Hable et al. | 345/173 |
| 2013/0147732 A1* | 6/2013 | Peterson et al. | 345/173 |

FOREIGN PATENT DOCUMENTS

| | | |
|---|---|---|
| TW | 200620122 | 6/2006 |
| TW | 200933463 A | 8/2009 |
| TW | 200945151 A | 11/2009 |

* cited by examiner

*Primary Examiner* — Roy Rabindranath
(74) *Attorney, Agent, or Firm* — Muncy, Geissler, Olds & Lowe, P.C.

(57) ABSTRACT

Stimulus regions are defined based on the traces of a capacitive touch panel. A first signal is applied to a first trace in a first direction under a second signal applied to a second trace in a second direction to stimulate the second trace, to sense a stimulus region for an ADC value thereof. Calibration parameters for the traces are determined according to the ADC values of the traces without being touched, and are stored for later sensing the traces for position calculation and multi-finger calculation.

74 Claims, 14 Drawing Sheets

SENSING METHOD AND CALIBRATION METHOD FOR A CAPACITIVE TOUCH PANEL

FIELD OF THE INVENTION

The present invention is related generally to a capacitive touch panel and, more particularly, to a sensing method and calibration method for a capacitive touch panel.

BACKGROUND OF THE INVENTION

Sensing a capacitive touch panel is achieved by cooperation between the capacitive touch panel and the hardware, firmware and software of the touch circuit. For example, a capacitive touch panel having a two-dimensional trace layout requires a two-dimensional touch circuit to sense therewith and to convert the sensed capacitance variation of each trace into a digital value, called analog-to-digital conversion (ADC) value, for position detection of the object thereon.

FIG. 1 is a schematic diagram of a typical capacitive touch panel module, which includes a component carrier 10, a capacitive touch panel 12 and a capacitive touch sensor 14 printed on the capacitive touch panel 12. The component carrier 10 is typically a flexible printed circuit (FPC) board, with a chip of integrated circuit (IC) including a detector circuit deposited thereon and connected to the capacitive touch sensor 14 through the metal wires printed on the component carrier 10.

In terms of object detection, a two-dimensional capacitive touch panel requires much less computation than an all-point-array capacitive touch panel. However, for multi-finger applications, a two-dimensional capacitive touch panel has its congenital defect, the ghost phenomenon, that is not found in an all-point-array capacitive touch panel. FIG. 2 is a schematic diagram showing the ghost phenomenon, and as it is shown, a two-dimensional capacitive touch panel 12 has X traces X1-Xm and Y traces Y1-Yn, and the conventional two-dimensional object detection includes sequential scan of all the traces X1-Xm and Y1-Yn one by one to extract the X and Y ADC values, and combination of the X and Y ADC values to locate the object position. In single-finger applications, for example, only one finger touching at the position 20, the X and Y traces are sequentially scanned for their ADC values which indicate the capacitance variations thereof, and it will find that the traces where the position 20 is have significant capacitance variations, i.e., the X trace having the largest capacitance variation is the trace X3 and the Y trace having the largest capacitance variation is the trace Y3. Thus, it is easy to identify the finger position (X3,Y3), called "real point". However, if there are two fingers touching at the positions 20 and 22 respectively, then it will find two peaks on the X traces X3 and X10 and two peaks on the Y traces Y3 and Y10 after scanning all the X and Y traces. Therefore, from the combination of the peak ADC values, it will obtain four positions (X3, Y3), (X10, Y7), (X3, Y7) and (X10, Y3), indicated by the numerals 20, 22, 24 and 26, of which, however, the positions 24 and 26 have no fingers thereon and are called "ghost points". Obviously, the ghost points will lead to incorrect location of the fingers.

With the gradual popularization of multi-finger applications in capacitive touch panels, the modern capacitive touch panels are required to satisfy the needs of two or more finger detection. For the ghost issue on the two-dimensional object detection, a multi-touch sensing method is proposed to obtain all-point-array data from a two-dimensional structure, which may distinguish between real points and ghost points based on the characteristic that the trace of a real point will have a significantly greater or smaller self capacitance to ground than the trace of a ghost point. FIG. 3 is a schematic diagram showing a conventional two-step sensing method and FIG. 4 is a flowchart thereof. This method still includes the step S30 to sequentially scan the X and Y traces to get all the X and Y ADC values. However, the next step S32 will identify if there is a multi-finger touch, and if it does not find any multi-finger touch, then step S34 will be performed for position calculation with the X and Y ADC values whenever the capacitive touch panel is touched. If the step 32 does find a multi-finger touch, then step S36 will be performed to carry out a multi-finger scan which includes an inphase crisscross sensing process applied to the four positions 20, 22, 24 and 26, as shown in FIG. 3 for example. In further detail, the trace Y3 is stimulated by a current signal when sensing the trace X3 to detect the self capacitance variation of the position 20; the trace Y7 is stimulated by a current signal when sensing the trace X3 to detect the self capacitance variation of the position 24; the trace Y3 is stimulated by a current signal when sensing the trace X10 to detect the self capacitance variation of the position 26; and the trace Y7 is stimulated by a current signal when sensing the trace X10 to detect the self capacitance variation of the position 22. Then, step S38 is performed to get the ADC values from the real and ghost points 20, 22, 24 and 26, and step S40 compares the ADC values to distinguish between the real points 20, 22 and the ghost points 24, 26.

As illustrated in the above description, the conventional two-step sensing method first identifies a multi-finger touch and then senses the self capacitance variation of each possible position again with particular sensing process in the latter multi-finger scan. Unfortunately, the intersection points on a capacitive touch panel may be different in self capacitance. Thus, before the sensing process of FIG. 4, it is necessary to perform the inphase crisscross sensing process for each intersection point without being touched to get the ADC values thereof, in order to determine the calibration parameter of each intersection point for its analog-to-digital conversion. The calibration parameters are to make the ADC values of all the intersection points without being touched fall in a same level range, and are stored in advance for application to the sensing of the capacitive touch panel to calibrate the sensed data each time in the future. Therefore, when the capacitive touch panel is in practice, the ADC value detected from a trace will indicate the self capacitance variation of the trace, and can be used to distinguish between real points and ghost points correctly. For a two-dimensional capacitive touch panel, if the number of the X traces is m and the number of the Y traces is n, then the conventional two-step sensing method needs to store m×n calibration parameters in advance, which requires relatively large memory.

SUMMARY OF THE INVENTION

An object of the present invention is to provide a sensing method for a capacitive touch panel.

Another object of the present invention is to provide a calibration method for a capacitive touch panel.

A further object of the present invention is to reduce the memory requirement for storing the calibration parameters of a capacitive touch panel.

According to the present invention, stimulus regions are defined based on the traces of a capacitive touch panel. When sensing a first trace in a first direction, a first signal is applied to the first trace and a second signal is applied to a second trace in a second direction to stimulate the second trace, and an ADC value is detected from a stimulus region on the first trace and the second trace. The ADC value of a stimulus region on a sensed trace without being touched is used to determine the calibration parameters for the traces, such that the ADC values of the stimulus regions on a trace without being touched will fall within a level range. The calibration parameters are stored for later position calculation and multi-finger calculation. The second signal may be in phase or out of phase with the first signal, or a common voltage. In object detection, the traces are sensed for variation of their self capacitance but not mutual capacitance. The real points can be identified by scanning only the traces in either of the first direction and the second direction. By sensing the ADC values of the stimulus regions, the scan time of the capacitive touch panel is shorter, and the volume of the calibration parameters is less. The combination of the traces to define the stimulus regions is adjustable, and thus the sensing of the capacitive touch panel is adaptive to different applications for saving of power and time.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
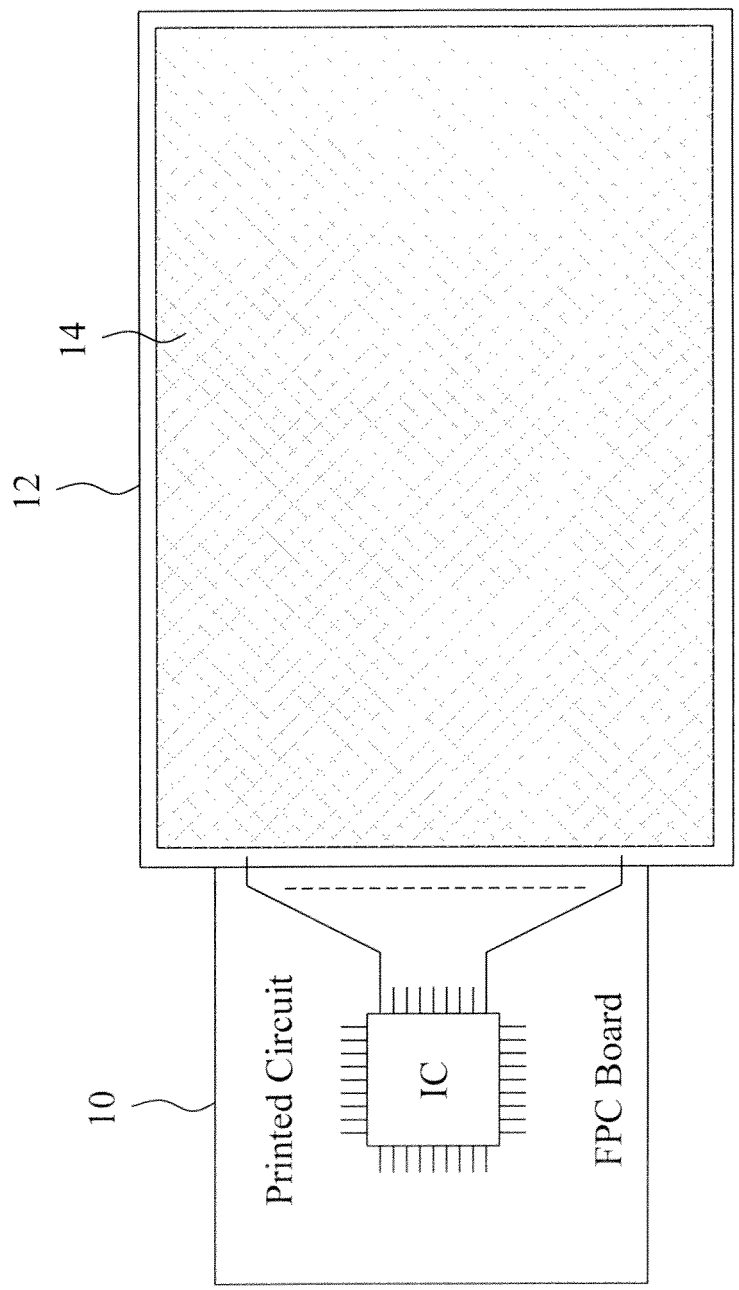
FIG. 1 is a schematic diagram of a typical capacitive touch panel module.
Figure 2:
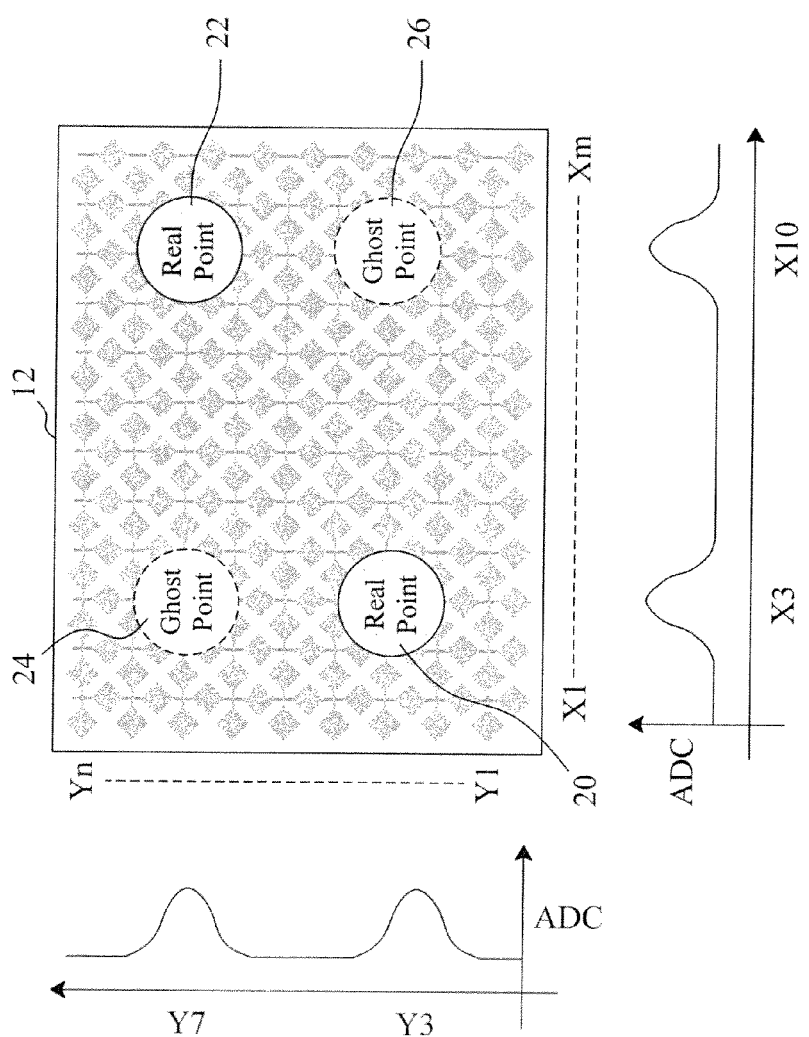
FIG. 2 is a schematic diagram showing the ghost phenomenon of a two-dimensional capacitive touch panel.
Figure 3:
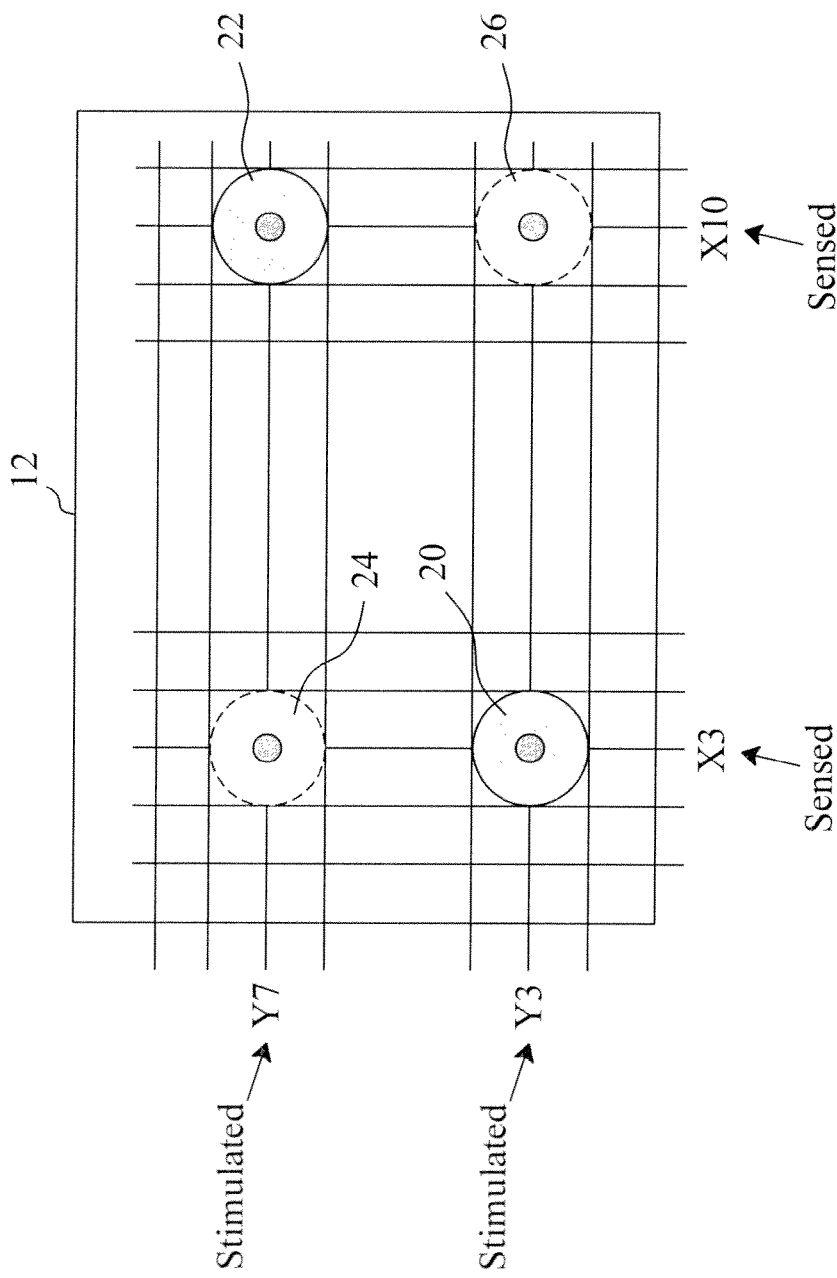
FIG. 3 is a schematic diagram showing a conventional two-step sensing method.
Figure 4:
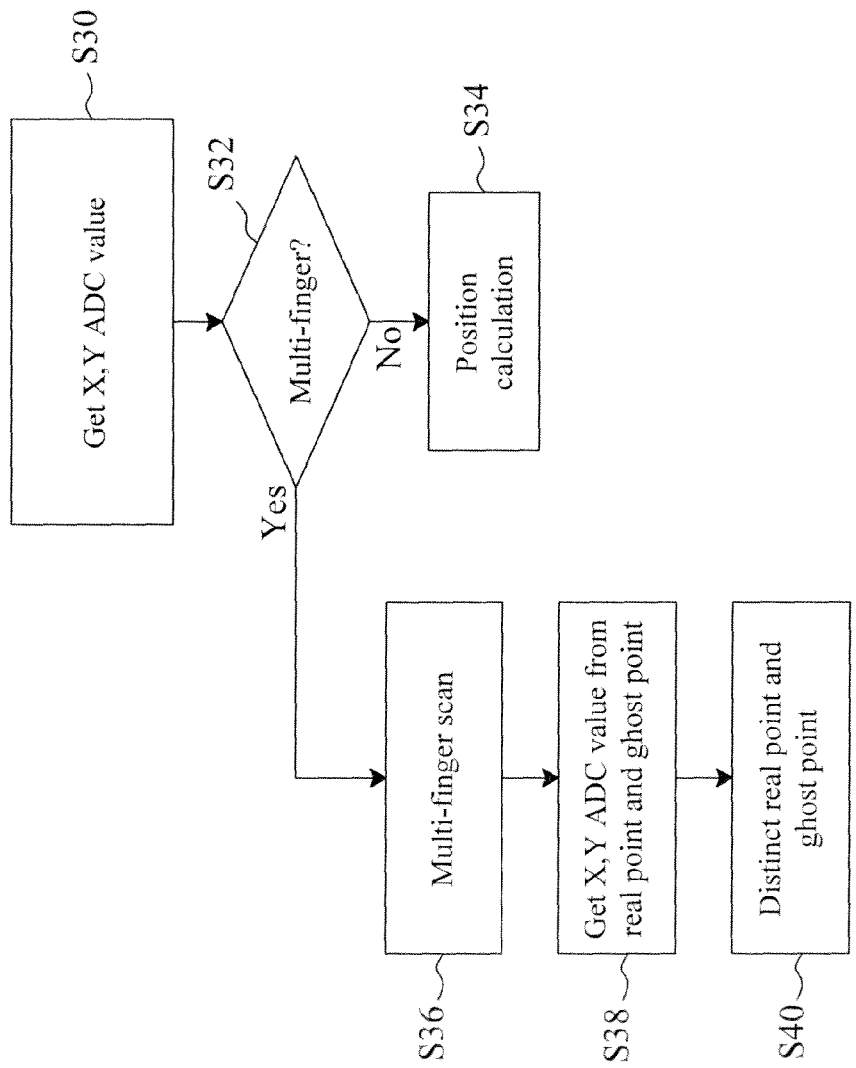
FIG. 4 is a flowchart of a conventional two-step sensing method.
Figure 5:
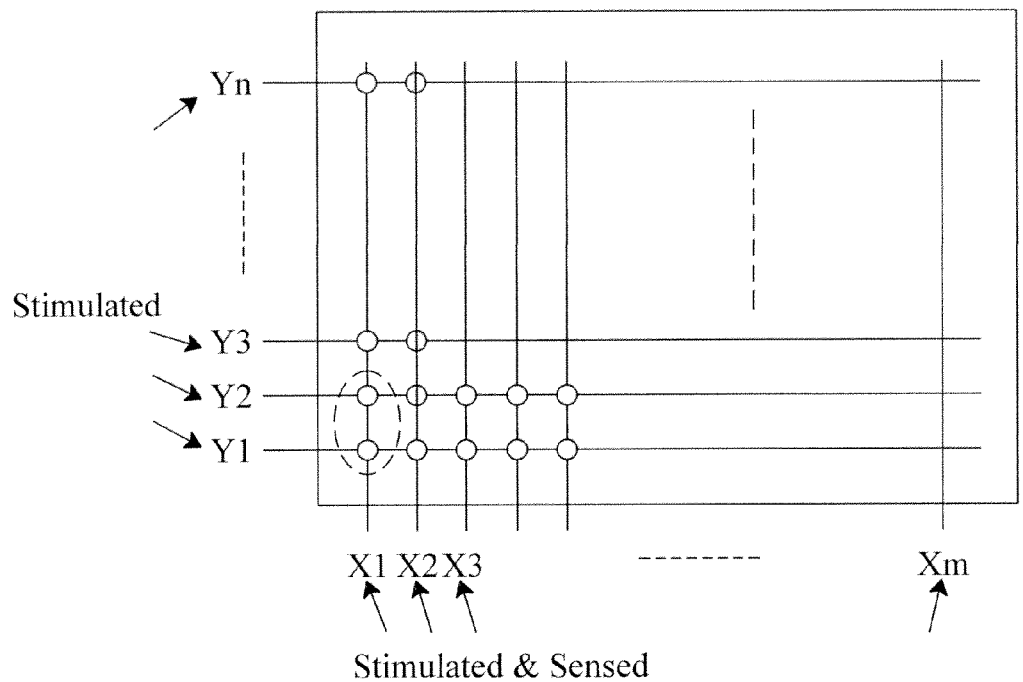
FIG. 5 is a schematic diagram showing sensing stimulus regions along the X traces.

FIG. 5 is a schematic diagram showing sensing stimulus regions along the X traces to detect the ADC values of the entire capacitive touch panel in advance as the reference for position calculation in the later object detection. When sensing the trace X1, a first signal is applied to the trace X1 to detect the ADC value thereof, and a second signal is sequentially applied to the traces Y1, Y2, ..., Yn to stimulate them one by one. In this embodiment, each intersection point between the trace X1 and the traces Y1-Yn is defined as a stimulus region. By sensing the trace X1 under the traces Y1-Yn stimulated one by one, the ADC values of the n stimulus regions defined on the trace X1 are obtained. Then, the ADC values of the n stimulus regions defined on the trace X2 are obtained in the same way, i.e., sensing the trace X2 under the traces Y1-Yn sequentially stimulated. In the same manner, the ADC values of all the traces are obtained for later position calculation for real points. The crisscross sensing process of detecting the ADC value of a stimulus region on a trace can be performed in other ways. For example, as shown in the table of FIG. 5, when sensing the trace X1, each time the second signal is simultaneously applied to two of the Y traces, e.g. Y1 and Y2. In this case, the stimulus region is defined larger, including two intersection points of an X trace with two of the Y traces, as indicated by the dash circle shown in FIG. 5. This approach will reduce the number of the total stimulus regions. For example, if defining a stimulus region to include only an intersection point results in n stimulus regions, then the number of the stimulus regions will be n/2 by defining a stimulus region to include two intersection points. In other embodiments, it is feasible to sense two of the X traces, e.g. X1 and X2 or X1 and X3, at a same time by using two detectors under stimulating the Y traces, to shorten the sensing time. In this way, for the crisscross sensing process, the X traces to be sensed and the Y traces to be stimulated may be combined one-to-one, one-to-many, many-to-one or many-to-many to define a group of stimulus regions, and by sensing each of the stimulus regions, the process of detecting the ADC values of the X traces will be completed with shorter time and less operation.

Figure 6:
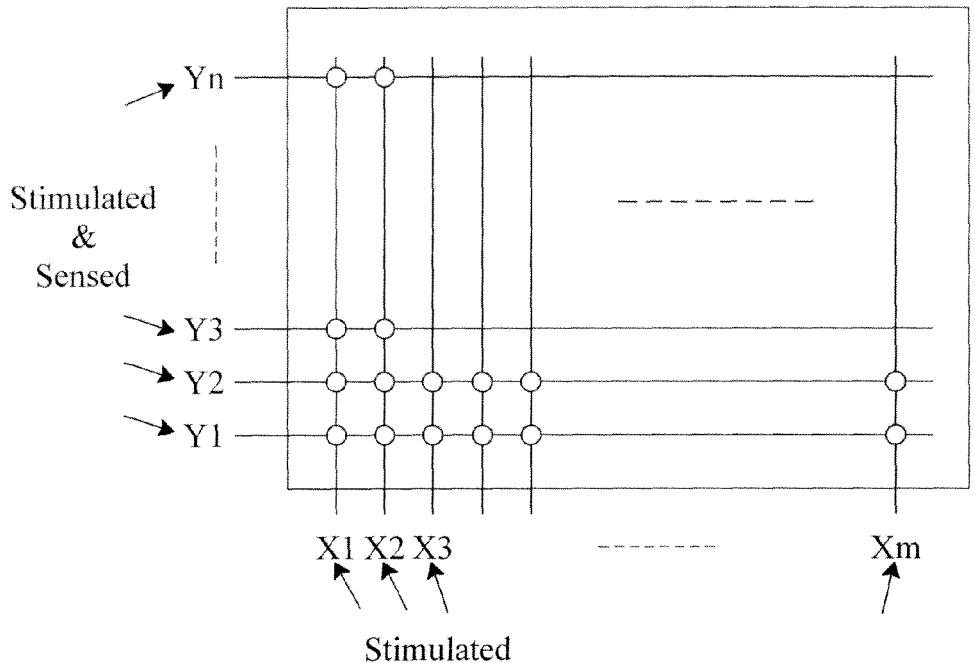
FIG. 6 is a schematic diagram showing sensing stimulus regions along the Y traces.

FIG. 6 is a schematic diagram showing sensing stimulus regions along the Y traces, which is the same as that illustrated in FIG. 5, combining the Y traces to be sensed and the X traces to be stimulated in one-to-one, one-to-many, many-to-one or many-to-many manner to define a group of stimulus regions for the crisscross sensing process. The ADC values of the stimulus regions defined on the X and Y traces are stored for later position calculation for real points. The stimulus regions as depicted in FIGS. 5 and 6 may be adjusted according to the system required resolution. Preferably, several groups of stimulus regions defined with different combinations of traces to be sensed and traces to be stimulated are pre-stored in the system, to be selected for use depending on the application modes to reduce power and time consumption for the crisscross sensing process.

Figure 7:
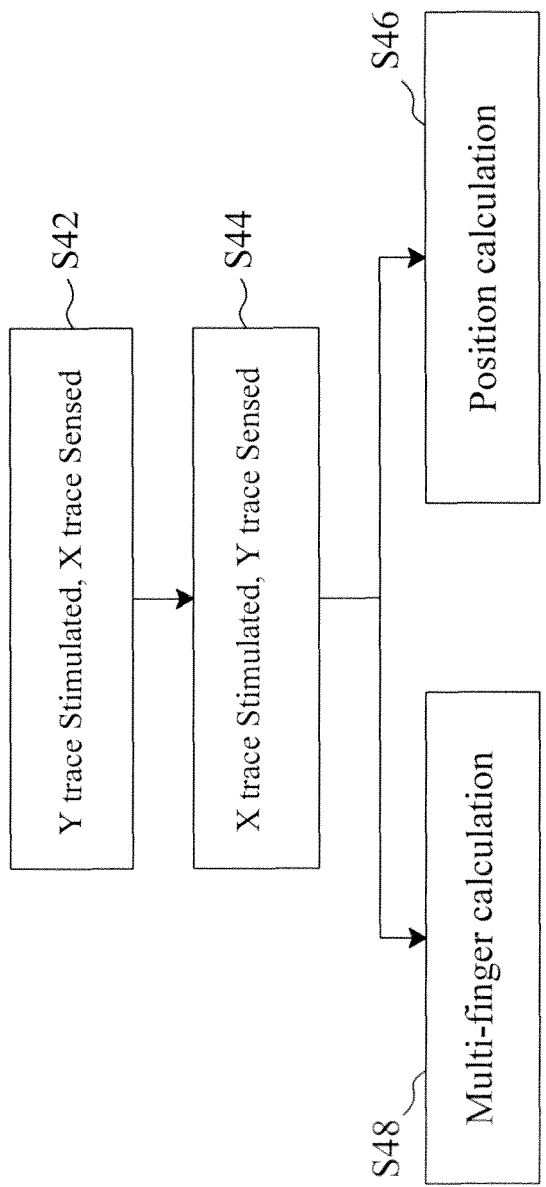
FIG. 7 is a flowchart of a sensing method using the stimulus region sensing scheme according to the present invention.

FIG. 7 is a flowchart of a sensing method using the stimulus region sensing scheme according to the present invention. In object detection, step S42 stimulates the Y traces and senses the X traces to extract a first ADC value of each stimulus region defined on the X traces, for example by the process illustrated in FIG. 5, and step S44 stimulates the X traces and senses the Y traces to extract a second ADC value of each stimulus region defined on the Y traces, for example by the process illustrated in FIG. 6. In other embodiments, the sequence of the steps S42 and S44 is exchanged without departing from the purpose of getting the ADC values of all stimulus regions. After the steps S42 and S44, the first and second ADC values obtained by sensing all the stimulus regions will provide sufficient information for position calculation S46 for single-finger applications and for multi-finger calculation S48. In the multi-finger calculation S48, depending on the algorithm used, it is possible to obtain the information of the entire capacitive touch panel sufficient to locate all the objects by merely sensing either the X traces or the Y traces.

Figure 8:
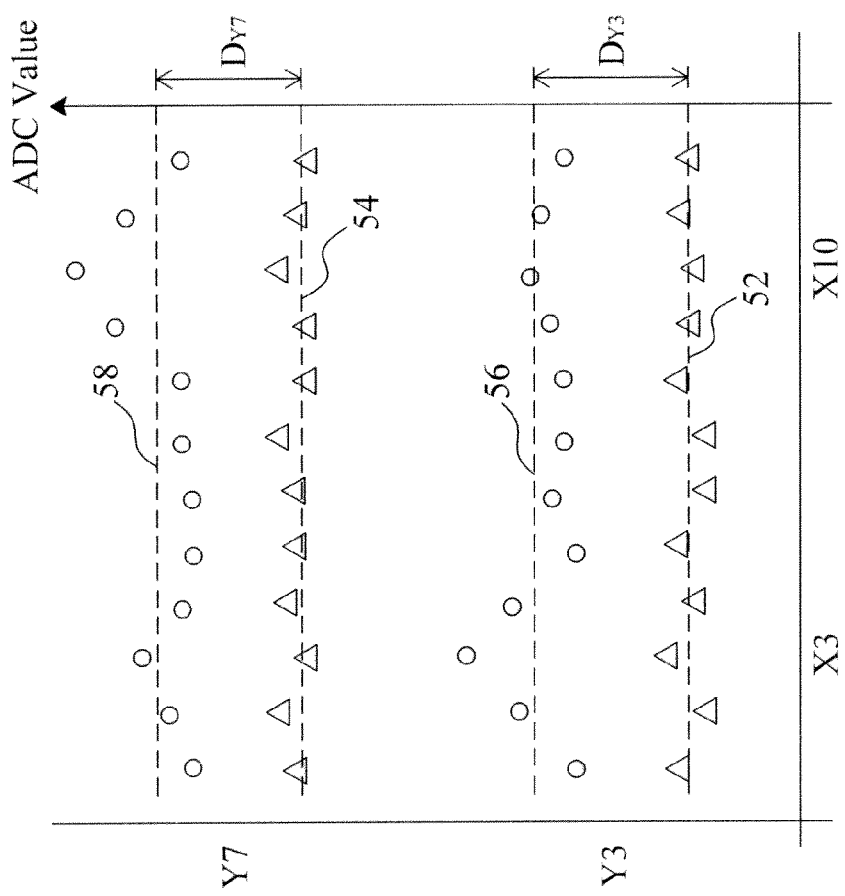
FIG. 8 shows a distribution of the ADC values of two Y traces obtained by using the one-to-one scheme to sense all the stimulus regions defined thereon.

For example, by using the one-to-one scheme in the step S44 to sense all the stimulus regions on the trace Y3 and Y7 shown in FIG. 6, a distribution of ADC values is obtained as shown in FIG. 8, in which the triangles represent the ADC values of the stimulus regions when the traces Y3 and Y7 are not touched, and the rounds represent the ADC values of the stimulus regions when the traces Y3 and Y7 are touched. Since the capacitive touch panel have been calibrated in advance, the object-absent ADC values sensed from the traces Y3 and Y7 will fall within a range around a level 52 and a level 54 respectively, and the object-present ADC values sensed from the traces Y3 and Y7 will obviously apart from the level 52 and the level 54 respectively. In the position calculation S46 of FIG. 7, an algorithm such as accumulation, averaging and weighted averaging may be used or a digital filter may be used, to determine the representative values of the traces Y3 and Y7 respectively. For the trace Y3, the object-absent representative value is near the level 52, and the object-present representative value 56 is apart from the level 52 by an obvious difference $D_{Y3}$, which indicates the self capacitance variation of the trace Y3 caused by the touch thereon. Likewise, the difference $D_{Y7}$ between the object-present representative value 58 and the object-absent representative value 54 indicates the self capacitance variation of the trace Y7 caused by the touch thereon.

Figure 9:
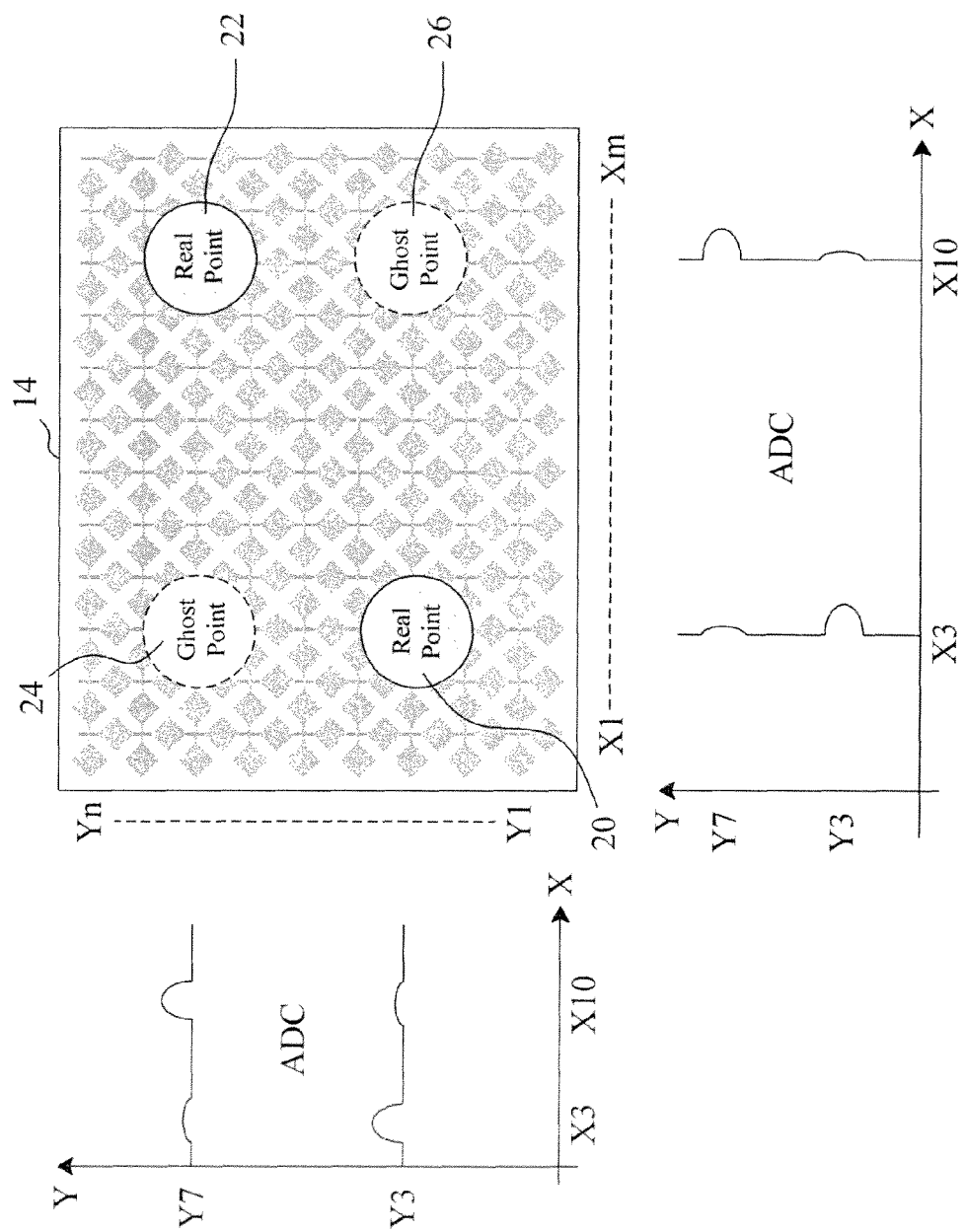
FIG. 9 is a schematic diagram showing a multi-finger calculation in an embodiment according to the present invention.

In single-finger applications, through the position calculation S46 shown in FIG. 7, the real point can be located with the representative values of the X and Y traces. However, in multi-finger applications, it is necessary to further use the steps S42 and S44 to sense the first and second ADC values of all the stimulus regions and the step S48 to locate the real points. FIG. 9 is a schematic diagram showing a multi-finger calculation in an embodiment according to the present invention. After the steps S42 and S44 of FIG. 7 to extract the ADC values of all the stimulus regions based on the calibration parameters of the traces, and the position calculation S46 to obtain the positions 20, 22, 24 and 26 that may be include one or more ghost points, the ADC values of the traces X3 and X10 or the ADC values of the traces Y3 and Y7 where the positions 20, 22, 24 and 26 are located are used to generate the distribution curves of the ADC values of the traces X3, X10, Y3 and Y7, as shown in the left part and the lower part of FIG. 9. Then, according to the varying level of the ADC values, the really real points 20 and 22 and the ghost points 24 and 26 are discriminated, thereby accomplishing the object positioning.

Figure 10:
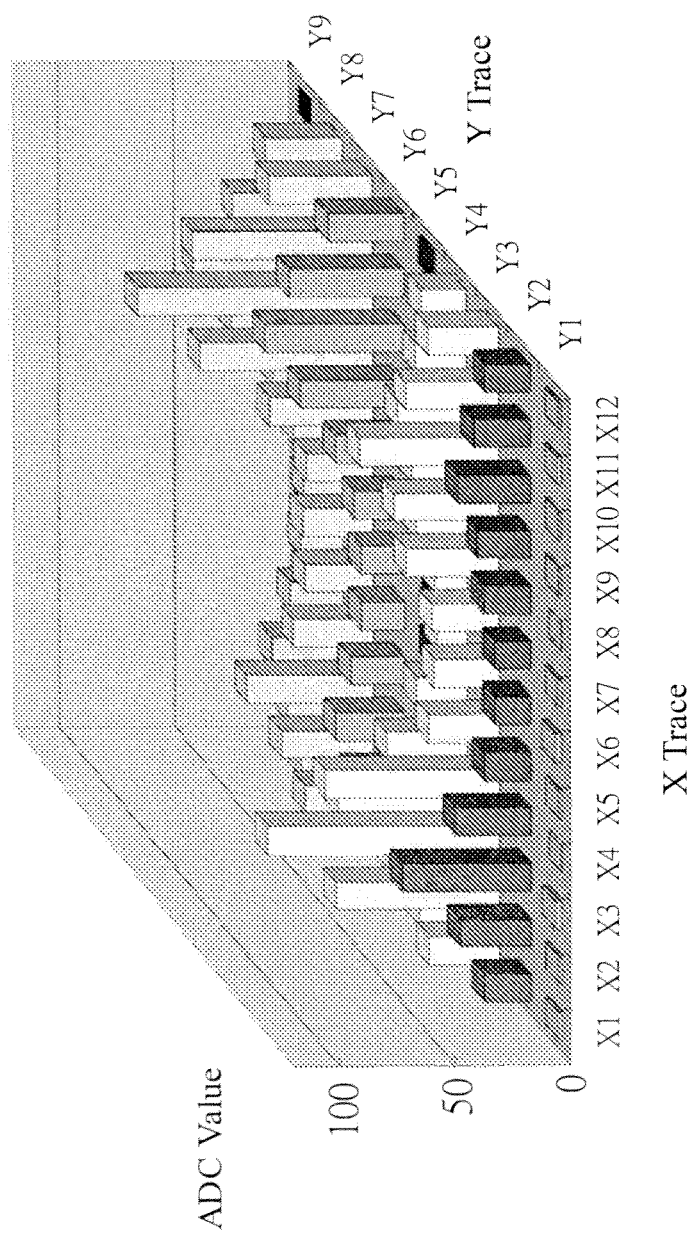
FIG. 10 is a 3-dimensional view of the ADC values of all the intersection points obtained by scanning the Y traces using the process of FIG. 7.

If using the process of FIG. 7 to perform the steps S42 and S44 with the one-to-one scheme for sensing all the stimulus regions for the ADC values of all the intersection points, the multi-finger calculation S48 may be directly performed with only the ADC values of one axis. As shown in FIG. 10, the ADC values of all the intersection points obtained by scanning the Y traces are plotted in a 3-dimensional (3D) view, which clearly shows the difference of self capacitance variation between real points and ghost points. Therefore, after sensing for an entire frame, since the self capacitance variation of each point on the capacitive touch panel has been extracted, finer multi-finger applications can be achieved later, by using multi-finger calculation such as an image processing algorithm. In addition, this method also helps to recognize the level of the pressure caused by the fingers. Thus, for the multi-finger calculation S48 alone, it can be easily accomplished by performing only one of the steps S42 and S44.

Figure 11:
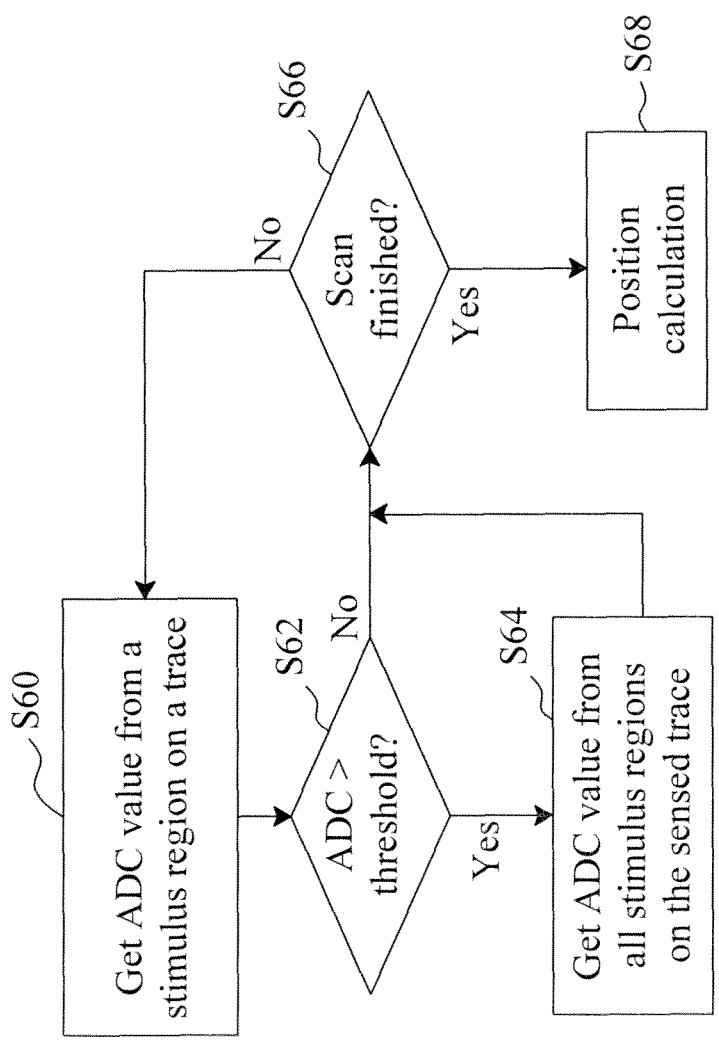
FIG. 11 is a flowchart of another embodiment for sensing stimulus regions according to the present invention.

Although the above embodiment solves the ghost problem, it may be limited to the stable time of the analog front end and thus take relatively long time for scanning all the stimulus regions. When applied to a large-size touch screen, this method may impact the frame rate. FIG. 11 is a flowchart of another embodiment for sensing stimulus regions according to the present invention, which uses hybrid scan to reduce the scanning time of a capacitive touch panel. In step S60, the traces in a direction are selected to be sensed, by which the ADC value of a stimulus region on one of the traces is detected, and then the detected ADC value is compared with a threshold value in step S62. If the detected ADC value is less than the threshold value, the process will return to the step S60 to sense the next one of the traces. If the detected ADC value is greater than the threshold value, it is indicated that there is a finger touching the sensed trace, and the process will go to step S64 to sense the ADC values of all the stimulus regions defined on the sensed trace. Then, the process returns to the step S60 to sense the next one of the traces. Step S66 identifies whether the scan to the traces in the selected direction has been finished. If yes, according to the ADC values of all the stimulus regions on the touched traces, step S68 is performed to locate the real points. In another embodiment, when the ADC value of a stimulus region on a trace is detected greater than the threshold value, it will directly sense all the other stimulus regions on the trace and all the stimulus regions on the next several traces to speed up the process by saving the comparison of the step S62. In yet another embodiment, the step S60 selects a direction to sense the stimulus region of the traces thereof in a jumping manner, e.g. the first trace, the third trace, the fifth trace and so on, by which the scan time for the entire capacitive touch panel will be dramatically reduced. Moreover, when the ADC value of a stimulus region on a sensed trace is greater than the threshold value, it will directly sense all the other stimulus regions on the sensed trace and all the stimulus regions on the next several traces in the jumping manner to further speed up the process by saving the comparison of the step S62.

Figure 12:
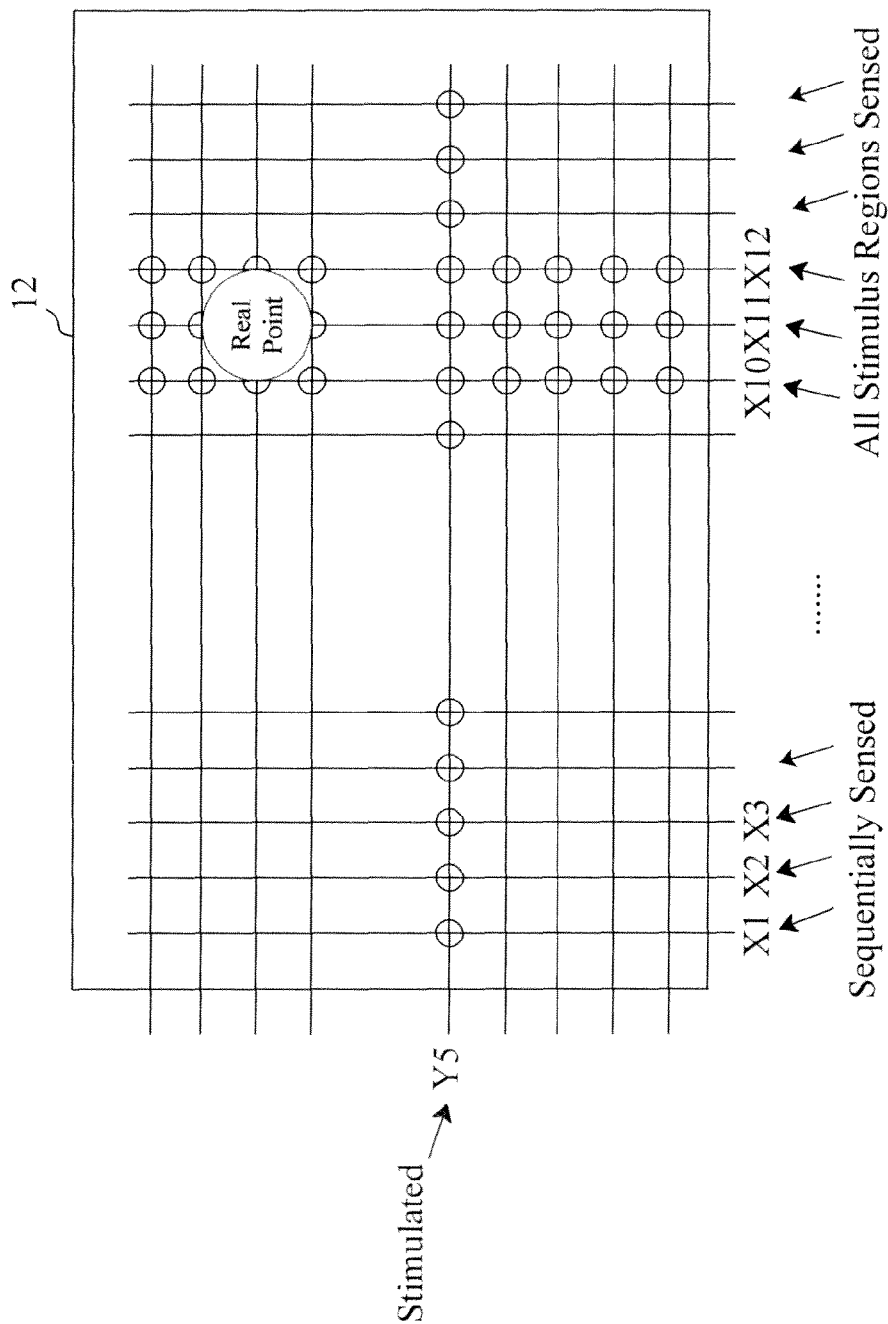
FIG. 12 is a schematic diagram showing the operation when using the sensing method of FIG. 11.

FIG. 12 is a schematic diagram showing the operation when using the sensing method of FIG. 11. At the beginning, the step S60 selects the X traces on the capacitive touch panel 12 to sense for ADC values. Foe example, the stimulus region defined at the intersection point (X1, Y5) between the traces X1 and Y5 is first sensed and then, from the detected ADC value, the step S62 identifies no fingers touching thereon. After the step S66 identifies that the scan to the X traces is not finished, the process returns to the step S60 for sensing the stimulus region defined at the intersection point (X2, Y5) between the next trace X2 and the trace Y5. Following the same procedure, the process will finally find that the ADC value of the stimulus region at the intersection point (X10, Y5) between the trace X10 and the trace Y5 is greater than the threshold value, since the trace X10 is touched. Therefore, the step S64 will sense all the other stimulus regions defined on the trace X10, i.e. at the intersection points (X10, Y1), (X10, Y2), (X10, Y3) and so on. Then, the next traces X11 and X12 may be sensed in the same way, i.e., sensing all the other stimulus regions thereof after the step S62. In another embodiment, after sensing all the other stimulus regions defined on the trace X10, it will directly sense all the stimulus regions defined on the next traces X11 and X12, without performing the step S62 for the traces X11 and X12, to achieve the same result. In still another embodiment, the step S60 selects the odd traces X1, X3, Y5 . . . to sense. In this case, the process will first find the intersection point (X11, Y5) having an ADC value greater than the threshold value, and thus directly sense all the stimulus regions on the traces X10 and X12 subsequently to sensing all the other stimulus regions on trace X11.

Figure 13:
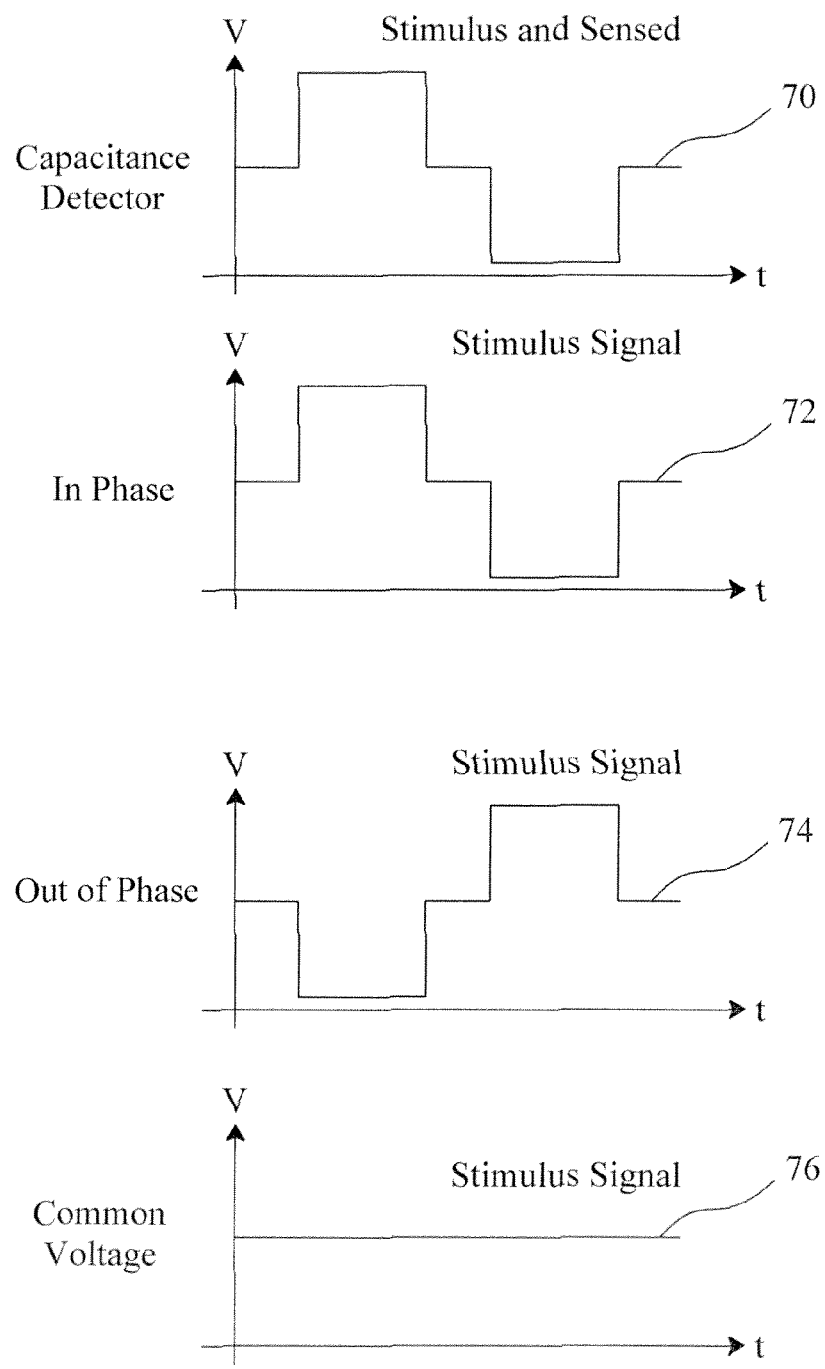
FIG. 13 is waveform diagram of the signals to be applied to the sensed trace and the stimulated trace when a voltage type detector circuit is used for sensing the self capacitance variation of the sensed trace.
Figure 14:
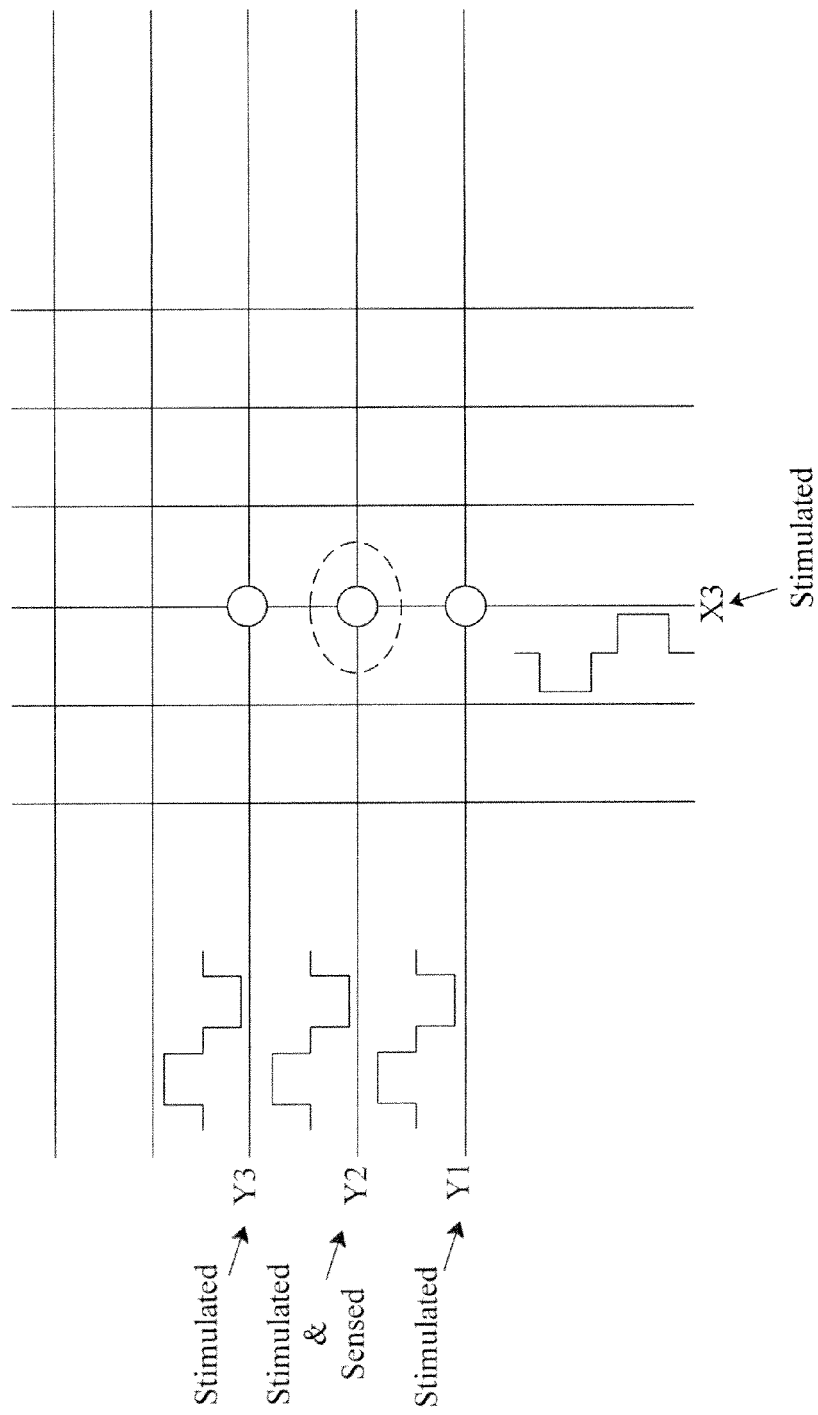
FIG. 14 is a schematic diagram showing another stimulus scheme for sensing a stimulus region.

Taking a voltage type detector circuit for example, referring to FIG. 13, when the first signal to be applied to the sensed traces for sensing for the ADC value thereof has a waveform 70, the second signal for stimulating the related trace or traces with a stimulus region may have an inphase waveform 72, an out-of-phase waveform 74 or a common voltage waveform 76. In other embodiments, for sensing and stimulating the traces, current signals or combination of a voltage signal and a current signal may be used instead to apply to the sensed trace and the stimulated trace. In addition, as shown in FIG. 14, it may use another stimulus scheme to sense the stimulus region at the intersection point (X3,Y2), in which in addition to a first signal applied to the trace Y2 for sensing the ADC value of the stimulus region and a second signal applied to the trace X3 for stimulating the trace X3, a third signal is also simultaneously applied to the traces Y1 and Y3 adjacent to the sensed trace Y2 for stimulating the traces Y1 and Y3. For example, as shown in FIG. 14, the second signal applied to the trace X3 is out of phase with the first signal applied to the trace Y2, and the third signal applied to the traces Y1 and Y3 is in phase with the first signal applied to the trace Y2. When sensing the trace Y2, stimulating the traces Y1 and Y3 with the third signal will reduce the influence caused by the lateral capacitances, i.e. mutual capacitances between traces, and thus allows the obtained ADC value representing the real self capacitance variation more precisely. Alternatively, all the traces other than the sensed trace Y2 and the stimulated trace X3 are simultaneously applied with a third signal having either of the waveforms 72, 74 and 76 shown in FIG. 13 and in this case, the common voltage waveform 76 is preferred for the trace X3; or all the traces other than the sensed trace Y2 and the stimulated trace X3 are simultaneously applied with a third signal having the inphase waveform 72, and the second signal applied to the trace X3 has the out-of-phase waveform 74.

In the calibration for the sensing method according to the present invention, it may sense only the ADC value of a stimulus region on the trace to be sensed, by which it will get a set of calibration parameters for analog-to-digital conversion to calibrate the ADC values of the sensed stimulus regions without being touched fall within a same level range. The calibration parameters of the stimulus regions are stored as the calibration parameters of the traces and for use when sensing each stimulus region in future. For a capacitive touch panel having m traces in the X direction and n traces in the Y direction, where m and n are positive integers, if it is desired to sense the traces in both the X and Y directions, the calibration parameters of the disclosed sensing method only requires memory space for m+n data; if it uses merely the traces in the X direction, the calibration parameters consume only space for storing m data; and if it uses merely the traces in the Y direction, the calibration parameters consume only space for storing n data.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A sensing method for a capacitive touch panel having a plurality of first traces in a first direction and a plurality of second traces in a second direction, the sensing method comprising the steps of:
    defining a plurality of stimulus regions based on the first traces and the second traces, wherein each first trace corresponds to at least two of the stimulus regions:
    sensing the first plurality of stimulus regions by providing a first signal for sensing the first traces and a second signal for stimulating the second traces, and by providing the first signal for sensing the second traces and the second signal for stimulating the first traces;
    obtaining and storing first calibration parameters for the first traces and second calibration parameters for the second traces;
    respectively deriving first ADC values and second ADC values of the stimulus regions according to a result of sensing the plurality of stimulus regions, the first calibration parameters and the second calibration parameters: and
    storing the first ADC values and the second ADC values of the stimulus regions for position calculation or multi-finger calculation to locate a real point;
    wherein the second signal is not simultaneously provided to all the first traces or all the second traces.

2. The sensing method of claim 1, wherein each of the first signal and the second signal is a voltage signal.

3. The sensing method of claim 1, wherein each of the first signal and the second signal is a current signal.

4. The sensing method of claim 1, wherein the first signal is a voltage signal and the second signal is a current signal.

5. The sensing method of claim 1, wherein the first signal is a current signal and the second signal is a voltage signal.

6. The sensing method of claim 1, wherein the second signal is in phase with the first signal.

7. The sensing method of claim 1, wherein the second signal is out of phase with the first signal.

8. The sensing method of claim 1, wherein the second signal is a common voltage.

9. The sensing method of claim 1, wherein the step of providing a first signal for sensing the first traces and a second signal for stimulating the second traces comprises the step of providing a third signal for stimulating at least one of the first traces adjacent to a sensed first trace.

10. The sensing method of claim 9, wherein the third signal is a voltage signal or a current signal.

11. The sensing method of claim 9, wherein the third signal is in phase with the first signal.

12. The sensing method of claim 9, wherein the third signal is out of phase with the first signal.

13. The sensing method of claim 9, wherein the third signal is a common voltage.

14. The sensing method of claim 1, wherein the step of providing a first signal for sensing the first traces and a second signal for stimulating the second traces comprises the step of providing a third signal for stimulating the rest of the first traces other than the sensed first trace.

15. The sensing method of claim 14, wherein the third signal is a voltage signal or a current signal.

16. The sensing method of claim 14, wherein the third signal is in phase with the first signal.

17. The sensing method of claim 14, wherein the third signal is out of phase with the first signal.

18. The sensing method of claim 14, wherein the third signal is a common voltage.

19. The sensing method of claim 1, wherein the step of providing the first signal for sensing the second traces and the second signal for stimulating the first traces comprises the step of providing a third signal for stimulating at least one of the second traces adjacent to a sensed second trace.

20. The sensing method of claim 19, wherein the third signal is a voltage signal or a current signal.

21. The sensing method of claim 19, wherein the third signal is in phase with the first signal.

22. The sensing method of claim 19, wherein the third signal is out of phase with the first signal.

23. The sensing method of claim 19, wherein the third signal is a common voltage.

24. The sensing method of claim 1, wherein the step of providing the first signal for sensing the second trace and the second signal for stimulating the first traces comprises the step of providing a third signal for stimulating the rest of the second traces other than the sensed second traces.

25. The sensing method of claim 24, wherein the third signal is a voltage signal or a current signal.

26. The sensing method of claim 24, wherein the third signal is in phase with the first signal.

27. The sensing method of claim 24, wherein the third signal is out of phase with the first signal.

28. The sensing method of claim 24, wherein the third signal is a common voltage.

29. The sensing method of claim 1, wherein the step of obtaining and storing first calibration parameters for the first traces and second calibration parameters for the second traces comprises the steps of:
sensing one of the stimulus regions on each of the first traces without being touched for first object-absent ADC values thereof;
deriving the first calibration parameters according to the first object-absent ADC values such that the first ADC values will fall within a first level range when the stimulus regions are not touched;
sensing one of the stimulus regions on each of the second traces without being touched for second object-absent ADC values thereof; and
deriving the second calibration parameters according to the second object-absent ADC values such that the second ADC values will fall within a second level range when the stimulus regions are not touched.

30. The sensing method of claim 29, wherein the position calculation comprises the step of:
calculating with the first ADC values of the stimulus regions to extract a first difference between the first ADC values and the first level range;
calculating with the second ADC values of the stimulus regions to extract a second difference between the second ADC values and the second level range;
locating a real point according to the first difference and the second difference.

31. The sensing method of claim 30, wherein the step of calculating with the first ADC values of the stimulus regions to extract a first difference between the first ADC values and the first level range comprises the step of accumulating, averaging or weighted averaging the first ADC values of the stimulus regions to generate the first difference.

32. The sensing method of claim 30, wherein the step of calculating with the second ADC values of the stimulus regions to extract a second difference between the second ADC values and the second level range comprises the step of accumulating, averaging or weighted averaging the second ADC values of the stimulus regions to generate the second difference.

33. The sensing method of claim 1, wherein each of the first traces has one first calibration parameter and each of the second traces has one second calibration parameter.

34. The sensing method of claim 1, wherein the first signal and the second signal are AC signals.

35. A sensing method for a capacitive touch panel having a plurality of first traces in a first direction and a plurality of second traces in a second direction, the sensing method comprising the steps of:
defining a plurality of stimulus regions based on the first traces and the second traces;
providing a first signal for sensing the first traces and a second signal for stimulating the second traces;
obtaining and storing calibration parameters for the first traces;
deriving ADC values of the stimulus regions using the calibration parameters; and
storing the ADC values of the stimulus regions for multi-finger calculation to locate real points.

36. The sensing method of claim 35, wherein each of the first signal and the second signal is a voltage signal.

37. The sensing method of claim 35, wherein each of the first signal and the second signal is a current signal.

38. The sensing method of claim 35, wherein the first signal is a voltage signal and the second signal is a current signal.

39. The sensing method of claim 35, wherein the first signal is a current signal and the second signal is a voltage signal.

40. The sensing method of claim 35, wherein the second signal is in phase with the first signal.

41. The sensing method of claim 35, wherein the second signal is out of phase with the first signal.

42. The sensing method of claim 35, wherein the second signal is a common voltage.

43. The sensing method of claim 35, wherein the step of providing a first signal for sensing the first traces and a second signal for stimulating the second traces comprises the step of providing a third signal for stimulating at least one of the first traces adjacent to a sensed first trace.

44. The sensing method of claim 43, wherein the third signal is a voltage signal or a current signal.

45. The sensing method of claim 43, wherein the third signal is in phase with the first signal.

46. The sensing method of claim 43, wherein the third signal is out of phase with the first signal.

47. The sensing method of claim 43, wherein the third signal is a common voltage.

48. The sensing method of claim 35, wherein the step of providing a first signal for sensing the first traces and a second signal for stimulating the second traces comprises the step of providing a third signal for stimulating the rest of the first traces other than the sensed first trace.

49. The sensing method of claim 48, wherein the third signal is a voltage signal or a current signal.

50. The sensing method of claim 48, wherein the third signal is in phase with the first signal.

51. The sensing method of claim 48, wherein the third signal is out of phase with the first signal.

52. The sensing method of claim 48, wherein the third signal is a common voltage.

53. The sensing method of claim 35, wherein the step of obtaining and storing calibration parameters for the first traces comprises the steps of:
sensing one of the stimulus regions on each of the first traces without being touched for object-absent ADC values thereof;

deriving the calibration parameters according to the object-absent ADC values such that the ADC values will fall within a level range when the stimulus regions are not touched.

54. The sensing method of claim 35, wherein each of the first traces has one calibration parameter.

55. The sensing method of claim 35, wherein the first signal and the second signal are AC signals.

56. A calibration method for a capacitive touch panel having a plurality of first traces in a first direction and a plurality of second traces in a second direction, the calibration method comprising the steps of:
obtaining respective ADC values of the first traces, each of which is performed by sensing one of a plurality of stimulus regions on one first trace, the sensing of one stimulus region comprising the steps of providing a first signal for sensing the first trace and stimulating a part of the second traces;
determining a calibration parameter for each first trace according to the respective ADC values of the first traces; and
storing the calibration parameters for later sensing for ADC values of stimulus regions on the first traces.

57. The calibration method of claim 56, wherein each of the first signal and the second signal is a voltage signal.

58. The calibration method of claim 56, wherein each of the first signal and the second signal is a current signal.

59. The calibration method of claim 56, wherein the first signal is a voltage signal and the second signal is a current signal.

60. The calibration method of claim 56, wherein the first signal is a current signal and the second signal is a voltage signal.

61. The calibration method of claim 56, wherein the second signal is in phase with the first signal.

62. The calibration method of claim 56, wherein the second signal is out of phase with the first signal.

63. The calibration method of claim 56, wherein the second signal is a common voltage.

64. The calibration method of claim 56, wherein the step of providing a first signal for sensing the first traces and a second signal for stimulating the second traces comprises the step of providing a third signal for stimulating at least one of the first traces adjacent to a sensed first trace.

65. The calibration method of claim 64, wherein the third signal is a voltage signal or a current signal.

66. The calibration method of claim 64, wherein the third signal is in phase with the first signal.

67. The calibration method of claim 64, wherein the third signal is out of phase with the first signal.

68. The calibration method of claim 64, wherein the third signal is a common voltage.

69. The calibration method of claim 56, wherein the step of providing a first signal for sensing the first traces and a second signal for stimulating the second traces comprises the step of providing a third signal for stimulating the rest of the first traces other than the sensed first trace.

70. The calibration method of claim 69, wherein the third signal is a voltage signal or a current signal.

71. The calibration method of claim 69, wherein the third signal is in phase with the first signal.

72. The calibration method of claim 69, wherein the third signal is out of phase with the first signal.

73. The calibration method of claim 69, wherein the third signal is a common voltage.

74. The sensing method of claim 56, wherein the first signal and the second signal are AC signals.

* * * * *